US008453233B2

(12) United States Patent
Haselsteiner et al.

(10) Patent No.: US 8,453,233 B2
(45) Date of Patent: May 28, 2013

(54) METHOD OF AND CIRCUIT FOR IDENTIFYING AND/OR VERIFYING HARDWARE AND/OR SOFTWARE OF AN APPLIANCE AND OF A DATA CARRIER COOPERATING WITH THE APPLIANCE

(75) Inventors: Ernst Haselsteiner, Graz (AT); Gregor Sueng, Graz (AT); Ernst Steiner, Tobelbad (AT)

(73) Assignee: NXP B.V., Eindhoven (NL)

( * ) Notice: Subject to any disclaimer, the term of this patent is extended or adjusted under 35 U.S.C. 154(b) by 1513 days.

(21) Appl. No.: 10/574,630

(22) PCT Filed: Oct. 5, 2004

(86) PCT No.: PCT/IB2004/051976
§ 371 (c)(1),
(2), (4) Date: May 12, 2008

(87) PCT Pub. No.: WO2005/033914
PCT Pub. Date: Apr. 14, 2005

(65) Prior Publication Data
US 2008/0209548 A1 Aug. 28, 2008

(30) Foreign Application Priority Data

Oct. 6, 2003 (EP) .................................. 03103686

(51) Int. Cl.
*G06F 7/04* (2006.01)
(52) U.S. Cl.
USPC .......................................................... 726/21
(58) Field of Classification Search
None
See application file for complete search history.

(56) References Cited

U.S. PATENT DOCUMENTS

2002/0134837 A1 9/2002 Kishon
2003/0041250 A1* 2/2003 Proudler ........................ 713/182

FOREIGN PATENT DOCUMENTS
EP 1 280 042 1/2003

* cited by examiner

*Primary Examiner* — Kaveh Abrishamkar

(57) ABSTRACT

In a method of and circuit for identifying and/or verifying the hardware and/or software of an appliance and of a data carrier, for example a smartcard, cooperating with the appliance, it is provided that a first unit (E1) for verifying the hardware and/or software of the appliance, in particular a Trusted Platform Module (TPM), and a second unit (E2) for verifying and/or identifying and authorizing the external data carrier, in particular a Secure Application Module (SAM), are coupled for direct data exchange via a communication interface (17) of the central arithmetic units (2, 10), in order to reduce or eliminate the possibility of attack or manipulation.

15 Claims, 4 Drawing Sheets

METHOD OF AND CIRCUIT FOR IDENTIFYING AND/OR VERIFYING HARDWARE AND/OR SOFTWARE OF AN APPLIANCE AND OF A DATA CARRIER COOPERATING WITH THE APPLIANCE

The invention relates to a method of identifying and/or verifying hardware and/or software of an appliance and of a data carrier cooperating with the appliance.

The invention furthermore relates to a circuit for identifying and/or verifying hardware and/or software of an appliance and of a data carrier cooperating with the appliance.

The invention furthermore relates to an appliance comprising such a circuit.

In connection with the identification and/or verification of hardware and/or software of an appliance or of a data carrier which cooperates with the appliance, it is becoming increasingly important to protect from unauthorized access electronic data which are stored in the appliance or in the data carrier or which can be communicated between the data carrier and the appliance.

Such data may be stored or used for example in a PC, a CD player, a DVD player, a TV, a mobile telephone or a PDA, wherein these appliances contain hardware and/or software which has to be protected against unauthorized access. In this connection, it is known to protect such possibly unsecured appliances for example by means of a so-called Trusted Platform Module (TPM). In this case, the main processor or central arithmetic unit of such an appliance that is to be protected is verified in terms of the integrity of its main components only by using such a TPM, so that the latter can prevent for example the introduction of viruses or Trojan horses.

Moreover, in connection with readers for external data carriers, for example for a smartcard, it is known to provide verification in the region of the communication between the smartcard and the central arithmetic unit of such a reader, wherein use is made for example of a so-called Secure Application Module (SAM) which allows verification of the authorization data, present for example on a smartcard, prior to forwarding external data stored on the smartcard to the central arithmetic unit of the appliance.

In order to allow both verification and/or identification of the hardware and/or software of the central arithmetic unit and also verification and/or identification or authorization of a data carrier that is external to the appliance, for example a smartcard, it has been proposed to combine both for example a TPM and a SAM via respective interfaces to the central arithmetic unit or main processor of the appliance, as can be found for example in the document US 2002/0134837 A1.

Such known designs using two separate modules or chips for the TPM and the SAM have proven to be disadvantageous since communication for example between the TPM and the SAM can take place only via the central arithmetic unit of the appliance. In particular, the connections between the individual modules and the central arithmetic unit of the appliance via appropriate interfaces and lines are moreover susceptible to attacks or manipulations. It would thus be easy to destroy or adversely affect the appliance that is to be protected and in this way gain access to the easily attackable connection between the respective modules and the central arithmetic unit and also between an external data carrier and the interconnected SAM and thus impair correct functioning of the appliance that is to be protected and/or gain unauthorized access to data in the appliance or in the data carrier. Moreover, it is assumed that for example the TPM is connected to the appliance that is to be connected and thus cannot readily be replaced or can be replaced only by opening the appliance. It is furthermore assumed that the modules TPM and SAM used possibly have different operating systems and possibly use different memory configurations and in particular different encryption algorithms, so that direct communication or connection, particularly for the purpose of verifying and/or identifying security-related data, such as access data, between the individual modules is not possible. It is furthermore assumed that, when using separate modules, in each case different identification codes or ID codes are or have to be allocated to said modules, so that an increased outlay is necessary for example when initializing the individual components.

It is an object of the invention to provide a method and a circuit of the type mentioned in the introduction, in which the above-mentioned disadvantages are avoided.

In order to achieve the above-mentioned object, a method according to the invention for identifying and/or verifying hardware and/or software of an appliance and of a data carrier cooperating with the appliance comprises the following steps:

a method of identifying and/or verifying hardware and/or software of an appliance and of a data carrier which is provided to cooperate with the appliance, comprising the following steps:

transmitting first authorization data of the hardware and/or software to a first unit, comparing the first authorization data of the hardware and/or software that has been transmitted to the first unit with first verification data stored in the first unit, authorizing the hardware and/or software once it has been ascertained that there is coincidence between the first authorization data provided by the hardware and/or software and the first verification data stored in the first unit, transmitting second authorization data of a data carrier to a second unit, comparing the second authorization data in the second unit with second verification data stored in the second unit, authorizing the data carrier if there is coincidence between the second authorization data and the second verification data stored in the second unit, wherein a direct data exchange is carried out between the first unit and the second unit.

In order to achieve the above-mentioned object, features according to the invention are provided in a circuit according to the invention for identifying and/or verifying hardware and/or software of an appliance and of a data carrier cooperating with the appliance, so that such a circuit according to the invention can be characterized as follows, namely:

a circuit for identifying and/or verifying hardware and/or software of an appliance and of a data carrier which is provided to cooperate with the appliance, comprising:

a first unit for identifying and/or verifying the hardware and/or software of the appliance, comprising a central arithmetic unit and at least one memory and an interface to the hardware and/or software that is to be identified and/or verified, and a second unit, comprising a central arithmetic unit and at least one memory and an interface to an external data carrier and also an interface to the hardware and/or software, wherein a communication interface is provided between the central arithmetic units of the first unit and the second unit.

In order to achieve the above-mentioned object, for an appliance which comprises as hardware at least one central arithmetic unit, which central arithmetic unit is designed to run software and to obtain data from an external data carrier cooperating with the appliance, it is moreover provided that a circuit of the type mentioned above is coupled to the central arithmetic unit.

By means of the features according to the invention, it is achieved that a direct communication or a direct data exchange between the first unit and the second unit is carried out while avoiding a detour via a central arithmetic unit of the appliance. In accordance with what has been stated above, the first unit for verifying and/or authorizing or identifying hardware and/or software of the appliance is for example once again formed by a Trusted Platform Module (TPM), whereas the second unit for verifying and/or authorizing the external data carrier may once again be formed by a Secure Application Module (SAM). As a result of the fact that according to the invention a direct data exchange or a direct communication is provided between the first and second units and in particular between the central arithmetic units of the first and second units, not only is it possible to make things simpler in that a connection to the central arithmetic unit of the appliance is not required in each case for communication between the units or modules, as is the case in the prior art, but rather it is possible to omit for example a complex mutual verification of the individual modules or a mutual authorization between the individual modules. Furthermore, according to the invention, when a direct data exchange or a communication interface is provided between the central arithmetic units of the first unit and of the second unit, the possibility of manipulation or attack on such a communication interface, which is integrated or accommodated in a common circuit, can be greatly reduced compared to the possibility of manipulation or attack on the interfaces between the individual modules and the central arithmetic unit. For direct data exchange between the first unit and the second unit, use may be made of a very simple communication protocol, such as for example the standardized $I^2C$ protocol, in order to allow direct communication between the central arithmetic units of the first unit and of the second unit.

According to the measures of claim 2, the advantage is obtained that reliable mutual verification of the first unit and of the second unit is provided. This may be effected for example in that a random number is generated and encrypted using a common key by the central arithmetic unit of one module, whereupon the encrypted number and a new random number are transmitted to the other module. If correct encryption is recognized by the second module, the latter again encrypts a random number using the common key and transmits this random number back to the first module, whereupon the first module in turn authenticates or identifies the second module. By virtue of the direct data exchange or communication interface between the first unit and the second unit, a correspondingly secure direct coupling between the first unit and the second unit is achieved, said two units being designed as active components.

According to the measures of claim 3, the advantage is obtained that alternate verification and identification between the first unit and the second unit or between the various modules takes place prior to verification and/or identification of hardware and/or software or of a data carrier cooperating with the appliance, so that it is ensured that none of the units or modules has been manipulated following an attack in the central arithmetic unit of the appliance or following an attack in data of an external data carrier.

According to the measures of claim 4, the advantage is obtained that elements or components that are provided in the individual units or modules are at least partially jointly used by the two units that are in direct data exchange or in direct communication, so that the outlay on manufacturing or designing the individual units or modules can be reduced.

According to the measures of claims 5 and 10, an additional increase in security during identification and/or verification is provided.

According to the measures of claims 6 and 13, the use of widely used external data carriers is provided.

According to the measures of claim 8, the advantage is obtained that the various memories that are required can be made available separately to the first unit and the second unit or the individual modules depending on requirements.

According to the measures of claim 9, the advantage is obtained that, where appropriate, components of the individual units or modules that perform the same or a similar function can be used jointly or be combined to form a single component, in order thereby to reduce or minimize the outlay on manufacturing the circuit according to the invention.

According to the measures of claim 11, the advantage is obtained that the outlay on manufacturing the circuit according to the invention can be further reduced since it is possible to make do with one common central arithmetic unit. Moreover, by providing one common central arithmetic unit which performs the function of the central arithmetic unit both of the first unit and of the second unit, it is possible to make do with a common interface to the hardware and/or software that is to be identified and/or verified, so that it is once again possible to achieve a reduction in the number of components that are required. By providing a combined or common central arithmetic unit, it is moreover achieved that attacks or manipulations on the interface or in connection with the direct data exchange between the first unit and the second unit are virtually not possible.

According to the measures of claim 15, the advantage is obtained that the possibilities for manipulation and/or for an attack on the connection or the interface between the circuit according to the invention and the central arithmetic unit of the appliance that is to be equipped therewith is furthermore reduced since, by virtue of the integration of the circuit according to the invention in the central arithmetic unit of the appliance that is to be equipped therewith, the communication or an interface required therefore is also directly integrated in the central arithmetic unit of the appliance that is to be equipped with the circuit according to the invention, wherein it is much more difficult to attack or manipulate such an integrated interface since this would require that the central arithmetic unit be opened for example, and this is virtually impossible.

The above-mentioned aspects and further aspects of the invention will emerge from the examples of embodiments described below and are explained with reference to these examples of embodiments.

The invention will be further described with reference to examples of embodiments shown in the drawings to which, however, the invention is not restricted.

FIG. 1 shows a block diagram of a first embodiment of a circuit according to the invention for carrying out a method according to the invention.

FIG. 2 schematically shows a flowchart in which the first unit and second unit, which are in direct data exchange or in direct connection, perform mutual verification.

Figure 1:
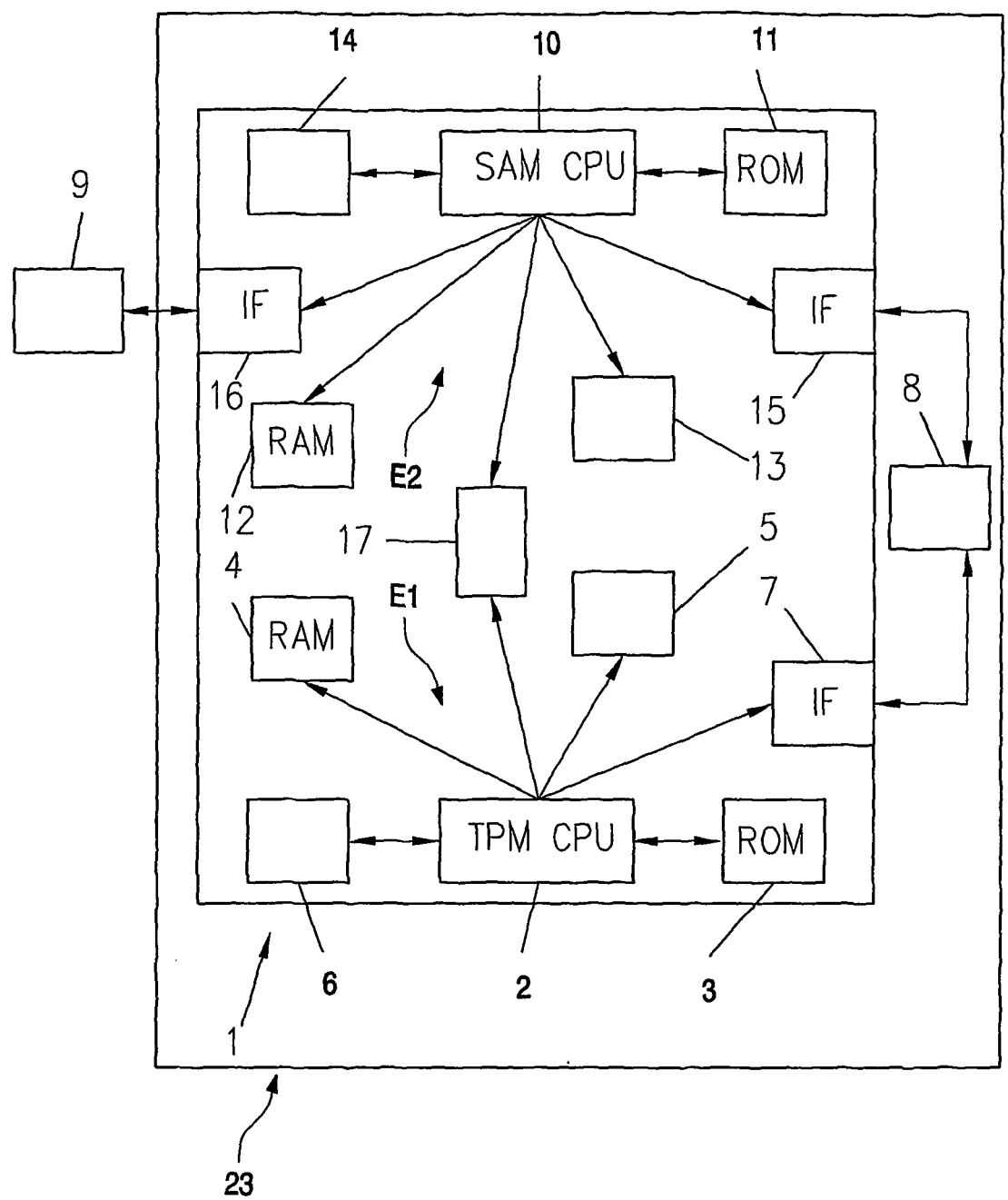
FIG. 1 shows in a general manner a block diagram of a circuit, in particular of an integrated circuit 1, wherein a first unit E1 and a second unit E2 for identifying and/or authorizing hardware and/or software of an appliance and for identifying and/or authorizing a data carrier (9) are in direct data exchange with one another.

The first unit E1 is essentially formed by a Trusted Platform Module TPM with a central arithmetic unit 2, which module TPM cooperates with a ROM 3 and a RAM 4 and a non-volatile memory 5, which may be formed for example by an EEPROM or Flash memory, as shown schematically in FIG. 1. There is furthermore an encryption machine 6 for the first unit E1 (TPM) and an interface 7, such as for example a low pin count interface, or LPC for short, to a central arithmetic unit 8 of an appliance 23 which is not shown in detail in FIG. 1.

The first unit E1, which is formed by a Trusted Platform Module TPM, serves to verify and/or identify and/or authorize hardware and/or software of the central arithmetic unit 8 of an appliance 23, which appliance 23 may be formed for example by a PC, a CD player, a TV, a mobile telephone or a Personal Digital Assistant.

In order to verify and/or identify authorization data of the schematically shown data carrier 9, which is formed for example by a smartcard, the second unit E2, which is formed in particular by a Secure Application Module SAM, consists of a central arithmetic unit 10 of the second unit E2, with a ROM 11 and a RAM 12 and at least one non-volatile memory 13 once again being provided in a manner similar to that of the first unit E1. For the encryption of data or information, an encryption machine 14 is also provided for the second unit E2. For communication with the central arithmetic unit 8 of the appliance 23, an interface 15 is also provided for the second unit E2. For communication with the external data carrier 9, an interface 16 is furthermore provided, which interface may be formed for example by an ISO 7816 interface and/or an ISO 14443 interface and/or a USB interface.

The identification and/or verification of hardware and/or software of the appliance 23 and also of the data carrier 9 in this case takes place in a general manner such that in each case individual authorization data are sent both by the hardware and/or software and also by the external data carrier 9 to the first unit E1 and second unit E2 with the interconnection of the corresponding interfaces 7 and 16, wherein a comparison with first verification data or second verification data takes place in the respective central arithmetic unit 2 or 10, in particular following encryption/decryption in the encryption devices 6 and 14, whereupon authorization takes place both of the hardware and/or software by the central arithmetic unit 2 and of the external data carrier 9 by the central arithmetic unit 10.

Moreover, in the block diagram shown in FIG. 1, a further communication interface 17 is provided which allows direct communication or connection or direct data exchange between the first unit E1, which is formed by the TPM, and the second unit E2, which is formed by the SAM.

By means of such a direct data exchange or direct communication via the interface 17 between the first unit E1 and the second unit E2, the possibility of manipulation or attack during the course of the data exchange between the two units E1 and E2 can be virtually completely ruled out. For the communication channel inside the circuit 1 provided by the interface 17, use may be made of a very simple communication protocol, for example the standardized I²C protocol, in order to allow direct communication between the central arithmetic unit 2 of the first unit E1 (hereinafter referred to in short as TPM) and the central arithmetic unit 10 of the second unit E2 (hereinafter referred to in short as SAM). The direct and simple communication allows direct and mutual authorization or identification of the first unit and also of the second unit E2, wherein use is made for example of a common key which is stored in the ROMs 3 and 11.

Figure 2:
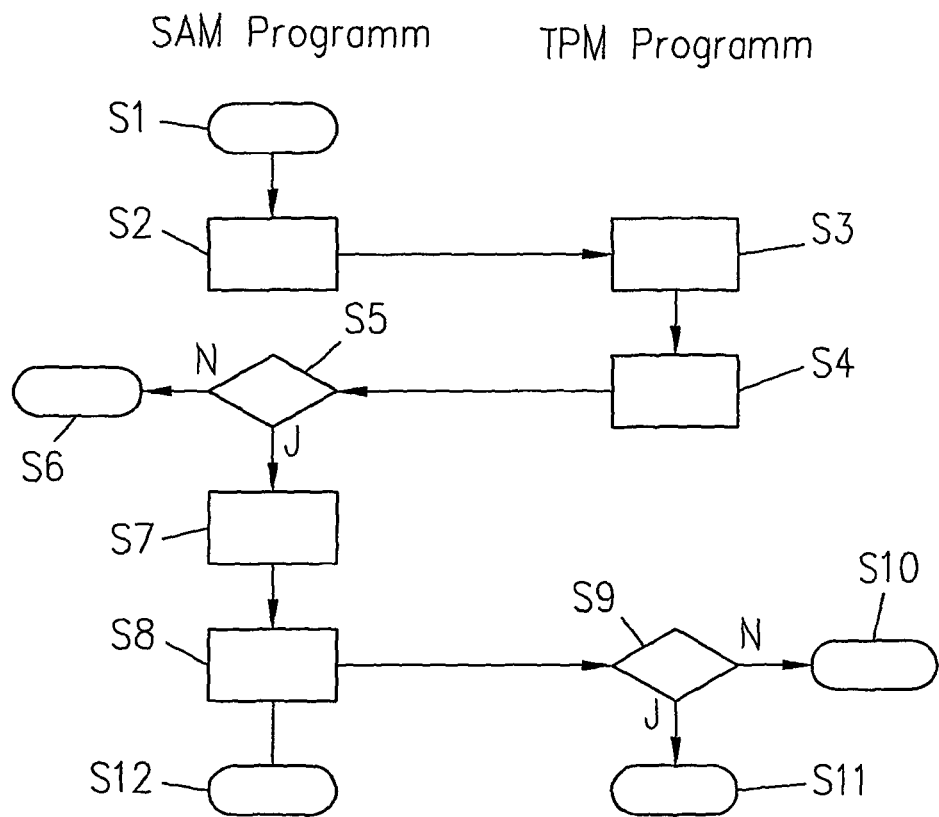

The authorization or identification of the first unit E1 (TPM) and of the second unit E2 (SAM) is explained in more detail below with reference to the flowchart shown schematically in FIG. 2.

In a first step S1, the circuit 1 shown in FIG. 1 is reset, whereupon in a step S2 a random number is sent to the central arithmetic unit 2 of the TPM by the SAM via the interface 17. By means of the encryption machine 6 of the TPM and a key that is jointly defined for the SAM and the TPM, said key being stored in the ROM 3, in a step S3 the random number is encrypted, which random number is sent in a step S4 via the interface 17 to the CPU or the central arithmetic unit 10 of the SAM together with a new random number which has been generated in the TPM.

In a step S5, verification takes place in the SAM as to whether a correct encryption using the common key has been carried out by the TPM, so that it is proven that the common key has actually been used in the TPM. If the result of the verification of the encryption is negative, the SAM is placed out of operation in a step S6.

If the result of the verification in step S5 is positive, an encryption of the new random number using the common key is carried out in the SAM in a step S7 using the encryption machine 14, whereupon in a step S8 the encrypted new random number is set to the CPU or central arithmetic unit 2 of the TPM via the interface 17.

Analogously to the verification in the SAM, in a step S9 verification takes place in the TPM as to whether a correct encryption has been carried out by the central arithmetic unit 2 of the SAM. If the encryption is not correct, the TPM is switched off in a step S10, whereas if it is correct the TPM is switched on or becomes or remains active in a step S11.

It should be mentioned at this point that the verification procedures may also be carried out by the SAM and the TPM in a different order.

The advantage of direct verification or authorization between the first unit E1 and the second unit E2 using the direct communication interface 17 shown in FIG. 1 is that a mutual verification between the SAM and the TPM can be carried out via a very simple direct connection without the interconnection for example of an external central arithmetic unit 8, as is the case in the known prior art.

Compared to the prior art, the advantage is moreover obtained that both the first unit E1, which in this case is formed by a TPM, and the second unit E2, which in this case is formed by an SAM, are active components, since alternate verification and/or identification or authorization can be carried out between the first unit E1 and the second unit E2 via the direct data exchange or direct communication via the interface 17 between the first unit E1 and the second unit E2 for example.

Figure 3:
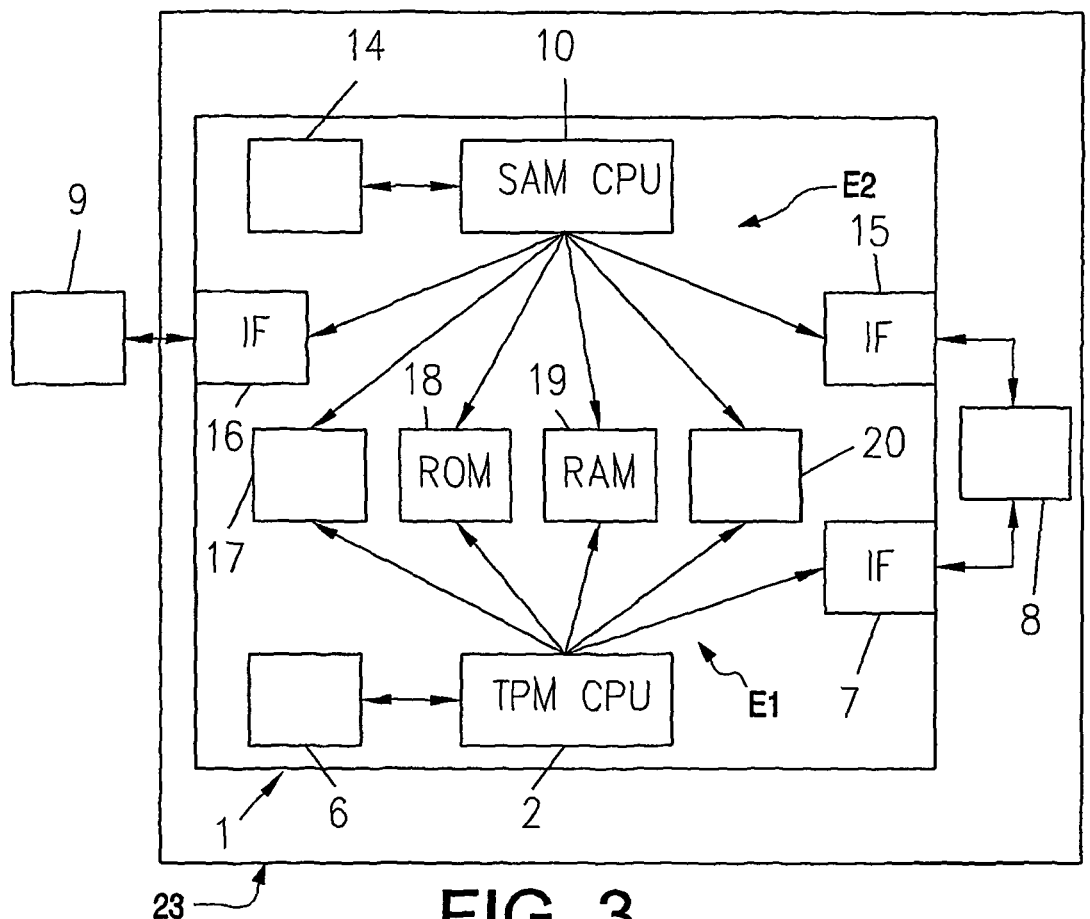
FIG. 3 shows, analogously to FIG. 1, a circuit according to the invention in a modified embodiment.

In the embodiment shown in FIG. 3, it is provided that the central arithmetic unit 2 or CPU of the TPM and the central arithmetic unit 10 or CPU of the SAM are connected via the direct communication interface 17. Unlike the embodiment shown in FIG. 1, however, in FIG. 3 it can be seen that the central arithmetic units 2 and 10 in each case access a common ROM 18 and a common RAM 19 and a common non-volatile memory 20. The number of elements required for the circuit 1 can thus be reduced compared to FIG. 1, so that a simplified design is obtained. Moreover, by providing the common elements 18, 19 and 20, a corresponding simplification and comparison of the data stored in the individual elements 18, 19 and 20 is also effected.

As in the embodiment shown in FIG. 1, in the embodiment shown in FIG. 3 an encryption machine 6 and 14 is also provided for each of the central arithmetic units 2 and 10. Like the embodiment in FIG. 1, interfaces 7 and 15 for communication with the central arithmetic unit or CPU 8 of the appliance 23 are also shown, whereas the CPU 10 of the SAM can communicate with an external data carrier, for example a smartcard, via the interface 16.

It may be mentioned that, unlike in the embodiment shown in FIG. 3, not all of the elements 18, 19 and 20 of the two central arithmetic units 2 and 10 have to be shared; rather, compared to the embodiment of FIG. 1, a corresponding simplification can be achieved for example solely by providing a common RAM 19.

Figure 4:
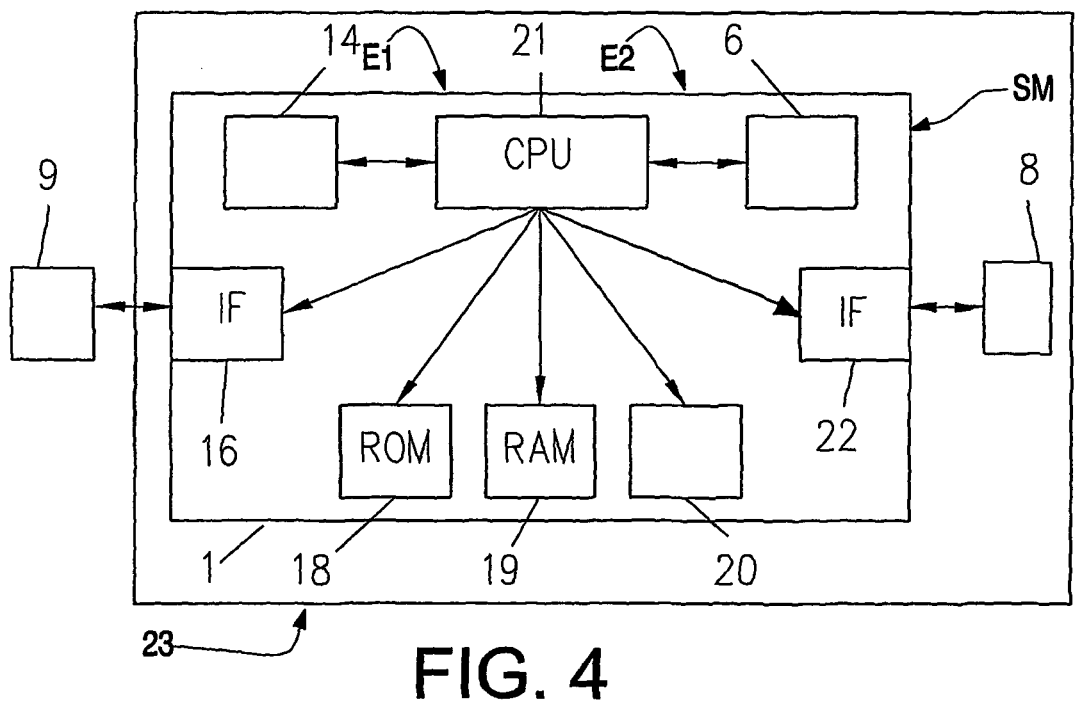
FIG. 4 shows a circuit according to the invention according to a further modified embodiment, wherein the central arithmetic units of the first unit and of the second unit are combined in one common central arithmetic unit.

In the farther modified embodiment shown in FIG. 4, it is provided that, instead of the separate arithmetic units 2 and 10 for the TPM and the SAM, it is possible to make do with a combined or common CPU 21 for the Security Module, which is now designated SM. The CPU 21 of the Security Module SM performs all the functions of the central arithmetic unit or CPU 2 of the TPM and also of the CPU 10 of the SAM. FIG. 4 shows that the combined CPU 21 once again cooperates with an encryption machine 14 corresponding to the encryption machine of the separate SAM of the previous embodiments and also with an encryption machine 6 corresponding to the encryption machine 6 of the TPM of the previous embodiments. As in the embodiment shown in FIG. 3, a common ROM 18 and a common RAM 19 and at least one common non-volatile memory 20 are provided, in particular taking account of the fact that just one combined central arithmetic unit or CPU 21 is now provided.

By combining the central arithmetic units of the TPM and SAM in one common central arithmetic unit 21, it is also possible to make do with a single interface 22 for a connection or communication with the central arithmetic unit 8. The interface 16 is once again provided for communication with an external data carrier 9.

The communication interface 17 of the embodiments shown in FIGS. 1 and 3, which is provided for direct data exchange or direct communication between the first unit E1 and the second unit E2, is directly integrated in the combined CPU 21 of the Security Module SM in the embodiment shown in FIG. 4. By means of such a provision of a combined or common CPU 21, the security of the circuit 1 with respect to a manipulation or attack can thus be further increased since it is usually much more difficult to carry out a direct attack in a CPU 21 than an attack in the region of an interface between individual elements of a circuit.

It can furthermore be seen that the number of components required for the circuit 1 can be further reduced since for example only one interface is required for the connection to the central arithmetic unit 8 and also at least some of the functionalities of the respective central arithmetic units of the SAM and TPM do riot have to correspondingly be provided a number of times in the combined CPU 21 of the Security Module SM in the embodiment shown in FIG. 4.

Figure 5:
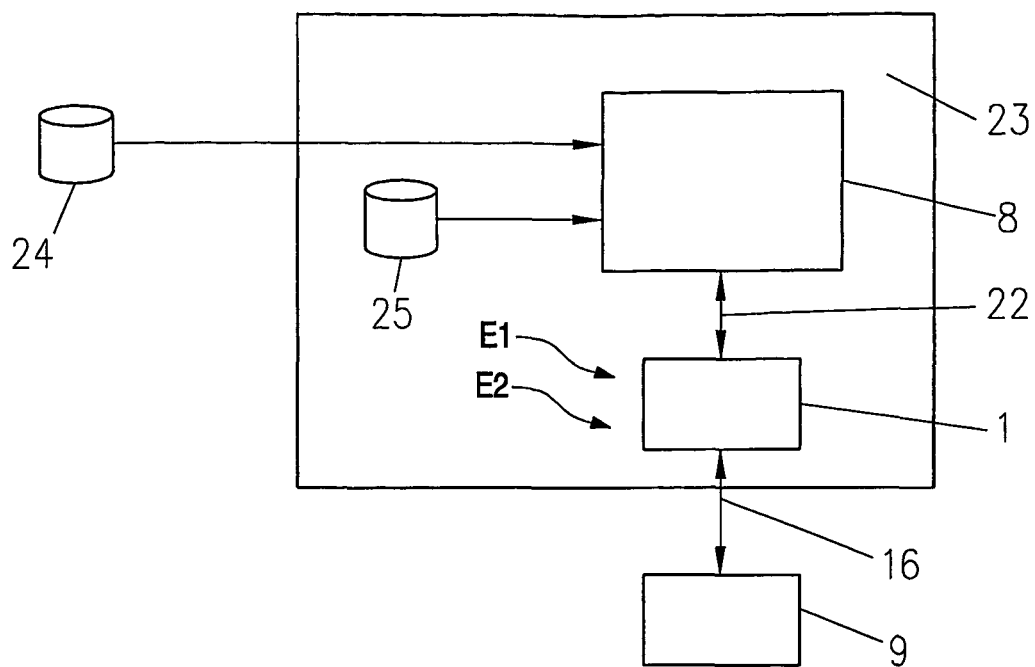
FIG. 5 shows, in the form of a block diagram, an appliance according to the invention which is coupled to a circuit according to the invention.

FIG. 5 shows a coupling of the circuit 1 shown in the previous embodiments to the central arithmetic unit or CPU 8 of the appliance 23. The circuit 1 shown in FIG. 5 may be one of the embodiments shown in FIG. 1, 3 or 4, so that in any case it must be assumed that direct communication between the TPM and the SAM is permitted or provided, unlike in the prior art in which a separate SAM for verifying an external data carrier 9 and a separate TPM for verifying or identifying the central arithmetic unit 8 are provided. The connection between the circuit 1 and the central arithmetic unit 8 may, as is the case in the embodiments shown in FIGS. 1 and 3, be provided via separate connections or via separate interfaces to the central arithmetic unit 8, whereas, when using a circuit 1 as shown in FIG. 4, only one interface 22 is provided for the connection or communication between the circuit 1 and the central arithmetic unit 8.

FIG. 5 further shows that in addition external data from an external data source 24 of the central arithmetic unit 8 and also data already contained within the appliance 23 from an internal data source 25 of this CPU 8 may be provided.

Figure 6:
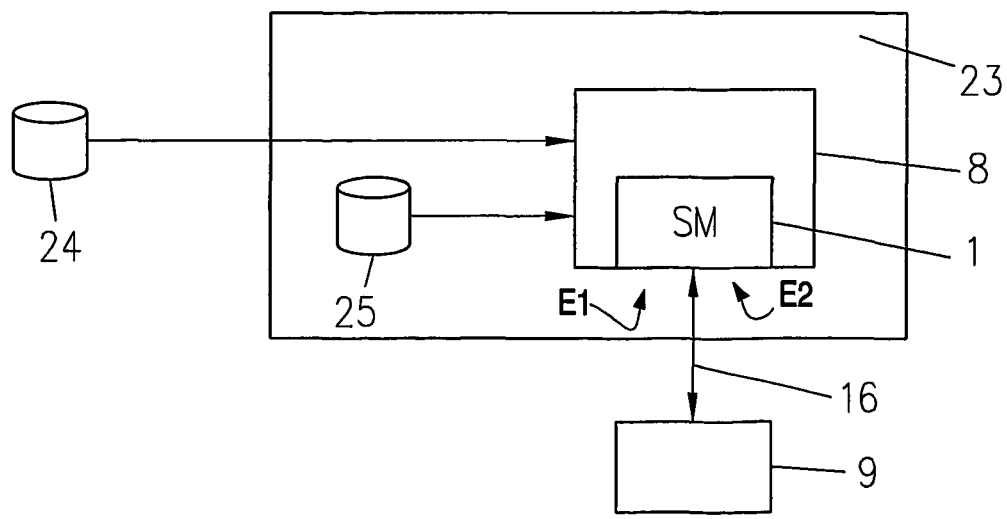
FIG. 6 shows, in a manner similar to FIG. 5, an appliance according to the invention in a modified embodiment, wherein the circuit according to the invention is integrated in the central arithmetic unit of the appliance.

In the modified embodiment shown in FIG. 6 it can be seen that a circuit 1 which comprises the Security Module SM shown in FIG. 4 is integrated in the central arithmetic unit or CPU 8 or coupled to the latter such that a connection is made between the Security Module SM and the central arithmetic unit 8 via an interface integrated in the central arithmetic unit 8. In this way, the possibilities of manipulation or attack in the communication or connection between the circuit 1 and the central arithmetic unit 8 can be further reduced compared to the embodiment shown in FIG. 5, so that overall the security of the communication during verification or identification or authorization is further increased.

It may be mentioned that, instead of the smartcard as external data carrier 9 mentioned by way of example in the examples of embodiments, use may also be made for example of a tag or an intelligent label.

It may furthermore be mentioned that besides the above-mentioned examples of the appliance 23, which related in particular to consumer goods, the appliance 23 may be formed for example by an access control device or a secure plant control device, wherein a verification of the integrity of the hardware and/or software or an identification of the same and a verification or identification of a data carrier are highly important for such appliances.

It may furthermore be mentioned that for example the data carrier 9 may be provided for contactless communication.

It may furthermore be mentioned that, besides accommodating or integrating a circuit 1 in an appliance 23, such a circuit 1 may also where appropriate be integrated in the corresponding data carrier 9 for verifying or identifying or authorizing its hardware or its software or for identifying and/or verifying an appliance 23 cooperating with the data carrier 9.

It may furthermore be mentioned that, instead of the SAM mentioned in the above-described examples of embodiments for the second unit E2, use may also be made of other modules or circuits which allow identification or authorization of authorization data of an external data carrier, for example of a smartcard. By way of example, in order to implement the functionality of the second unit, use may also be made of the functionality of a so-called reader, which is known in connection with an immobilizer for motor vehicles, wherein the functionality of the reader is used to authorize the electronic car key. As a further example, mention may be made of the functionality of a software routine which is run on a PC and makes an application or the PC available for use by a user only when the software authorizes an electronic key connected to the printer connection of the PC or the USB connection of the PC, which electronic key is also known as a "hardware dongle" and performs the function of the data carrier.

It may be mentioned that, instead of the TPM mentioned in the above-described examples of embodiments for the first unit, a functionality of a so-called "Trusted Computer Platform Alliance Chip" or of a "Trusted Computer Group Chip" may also be provided. Furthermore, in order to perform the function of the first unit, use may also be made of the functionality of a so-called "security chip" or "security module" manufactured by the company ATMEL, as are currently used in IBM laptops.

It may furthermore be mentioned that, instead of the common key, a pair of keys may also be used.

The invention claimed is:

1. A method of identifying and/or verifying hardware and/or software of an appliance and of a data carrier which is provided to cooperate with the appliance, the method comprising:
    transmitting first authorization data of the hardware and/or software to a first unit,
    comparing the first authorization data of the hardware and/or software that has been transmitted to the first unit with first verification data stored in the first unit,
    authorizing the hardware and/or software once it has been ascertained that there is coincidence between the first authorization data provided by the hardware and/or software and the first verification data stored in the first unit,
    transmitting second authorization data of a data carrier to a second unit,
    comparing the second authorization data in the second unit with second verification data stored in the second unit, and
    authorizing the data carrier if there is coincidence between the second authorization data and the second verification data stored in the second unit,
    wherein a direct data exchange is carried out between the first unit and the second unit.

2. A method as claimed in claim 1, wherein the direct data exchange between the first unit and the second unit comprises a transmission of encrypted data and a comparison and/or decryption of data transmitted between the first unit and the second unit.

3. A method as claimed in claim 1, wherein the data exchange between the first unit and the second unit is carried out prior to an identification and/or verification of first authorization data of the hardware and/or software and of second authorization data of the data carrier.

4. A method as claimed in claim 1, wherein a central arithmetic unit of the first unit and a central arithmetic unit of the second unit jointly access at least one ROM memory one RAM memory and/or one non-volatile memory.

5. A method as claimed in claim 1, wherein encryption of the first authorization data and of the second authorization data is carried out in the first unit and in the second unit.

6. A method as claimed in claim 1, wherein the second authorization data are obtained from a smartcard or a tag or a label that forms the data carrier.

7. A circuit for identifying and/or verifying hardware and/or software of an appliance and of a data carrier which is provided to cooperate with the appliance, the circuit comprising:
    a first unit for identifying and/or verifying the hardware and/or software of the appliance, comprising a central arithmetic unit and at least one memory and an interface to the hardware and/or software that is to be identified and/or verified, and
    a second unit comprising a central arithmetic unit and at least one memory and an interface to an external data carrier and also an interface to the hardware and/or software,
    wherein a communication interface is provided between the central arithmetic units of the first unit and the second unit.

8. A circuit as claimed in claim 7, wherein the memories of the first unit and of the second unit are formed by a ROM memory and a RAM memory and/or a non-volatile memory.

9. A circuit as claimed in claim 7, wherein the ROM memories and/or the RAM memories and/or the non-volatile memories of the first unit and of the second unit are in each case combined to form a common ROM memory and/or a common RAM memory and/or a common non-volatile memory.

10. A circuit as claimed in claim 7, wherein the first unit and the second unit in each case comprise an encryption device.

11. A circuit as claimed in claim 7, wherein the central arithmetic unit of the first unit and the central arithmetic unit of the second unit are combined to form a common central arithmetic unit which common central arithmetic unit has the integrated communication interface, and wherein the common central arithmetic unit is connected by an interface to the hardware and/or software that is to be identified and/or verified.

12. A circuit as claimed in claim 7, wherein the interface to the external data carrier is designed for contactless communication with the external data carrier.

13. A circuit as claimed in claim 7, wherein the external data carrier is formed by a smartcard or a tag or a label.

14. An appliance which comprises as hardware at least one central arithmetic unit which central arithmetic unit is designed to run software and to obtain data from an external data carrier cooperating with the appliance, wherein a circuit as claimed in claim 7 is coupled to the central arithmetic unit.

15. An appliance as claimed in claim 14, wherein the central arithmetic unit of the appliance is coupled via an interface integrated in the central arithmetic unit of the appliance to the circuit integrated in the central arithmetic unit.

* * * * *